United States Patent

Knab

[11] Patent Number: 6,002,228
[45] Date of Patent: Dec. 14, 1999

[54] DEVICE FOR ELECTRONICALLY CONTROLLING A MOTOR VEHICLE DISPLACEMENT MECHANISM

[75] Inventor: Norbert Knab, Appenweier, Germany

[73] Assignee: Robert Bosch GmbH, Stuttgart, Germany

[21] Appl. No.: 08/983,049

[22] PCT Filed: Feb. 28, 1997

[86] PCT No.: PCT/DE97/00367

§ 371 Date: Jan. 15, 1998

§ 102(e) Date: Jan. 15, 1998

[87] PCT Pub. No.: WO97/48158

PCT Pub. Date: Dec. 18, 1997

[30] Foreign Application Priority Data

Jun. 12, 1996 [DE] Germany ............ 196 23 420

[51] Int. Cl.$^6$ .................................... G05B 5/00
[52] U.S. Cl. ............. 318/469; 318/286; 318/446; 318/447; 318/461; 49/28
[58] Field of Search ............ 318/280–300, 318/445–489; 160/291–293; 44/26–28

[56] References Cited

U.S. PATENT DOCUMENTS

| | | | |
|---|---|---|---|
| 4,943,757 | 7/1990 | Richter et al. | 318/468 |
| 5,530,329 | 6/1996 | Shigematsu et al. | 318/469 |
| 5,663,620 | 9/1997 | Mizuno et al. | 318/466 |
| 5,689,160 | 11/1997 | Shigematsu et al. | 318/281 |
| 5,701,063 | 12/1997 | Cook et al. | 318/469 |
| 5,729,104 | 3/1998 | Kamishima et al. | 318/466 |
| 5,801,501 | 9/1998 | Redelberger | 318/283 |

FOREIGN PATENT DOCUMENTS 4318448 12/1994 Germany .

*Primary Examiner*—David Martin
*Attorney, Agent, or Firm*—Venable; George H. Spencer

[57] ABSTRACT

An apparatus for electronically monitoring an adjusting drive controlling a moving part in a vehicle is proposed wherein a position-dependent anti-jam system is realized. The signals of a switching strip and of an incremental sensor are considered in different manners, depending on the position of the moving part.

14 Claims, 1 Drawing Sheet

DEVICE FOR ELECTRONICALLY CONTROLLING A MOTOR VEHICLE DISPLACEMENT MECHANISM

BACKGROUND OF THE INVENTION

The invention relates to an apparatus for electronically monitoring an adjusting drive arranged in a vehicle.

DE-A 44 16 803 already discloses a method and an apparatus for the adjustment of power-operated parts, in particular, in a vehicle body. Therein at least two redundantly operating sensor systems are used, thus improving the reliability for the collision recognition. This serves to prevent the jamming of objects in the power-operated parts.

SUMMARY OF THE INVENTION

The apparatus according to the invention electronically monitors an adjusting drive arranged in a vehicle for adjusting the position of a movable part and it offers the advantage that, by way of the targeted selection of two sensor systems, their properties contribute within a position-dependent anti-jam strategy to prevent faulty triggering, on the one hand, and to enhance the safety in a danger zone, on the other hand. A combination of a switching strip, which performs electrical switching responsive to the application or removal of a force or pressure, with an incremental path transmitter of an adjustable movable part is advantageous because a jam situation which is hazardous to persons is present when a person is disposed between the switching strip receiving the part and the moved part. It is therefore advantageous to monitor the end position as well as the edge of the part. Precisely that is accomplished with the method according to the invention. Regulations such as, for example, FMVSS 118 also differentiate in a position-dependent manner with regard to the safety requirements.

If, for example, the side window of a vehicle is almost completely open, it is unlikely that a jam situation occurs which is hazardous to persons. A faulty triggering caused by unintended touching of the switching strip is probably the rule. In order to reduce the probability of faulty triggering in this region, the anti-jam system only responds, halting closing of the window, if a jam is detected on the part of the incremental sensor monitoring the adjustable part, namely the window, and on the part of the switching strip.

In contrast, the anti-jam system must respond quickly if, for example, the side window is about to close. If a person's fingers, for example, happen to touch the switching strip at that time, the adjusting drive which moves the part must be switched off immediately to prevent possible bruising. Safety is increased if, in this case, the anti-jam system responds when either the switching strip or the incremental sensor detects a jam.

Based on the position-dependent evaluation, the incremental sensor lends itself as a sensor system, with the signals of the incremental sensor being used to determine the position of the part as well as to determine the jamming of the part, for example, via an evaluation of the rotational speed change.

The switching strip lends itself as second sensor system because it monitors the end position of the adjustable part in an economical manner.

Owing to a combination of the two sensor elements in the present invention, an anti-jam system is realized which, on the one hand, is economical and, on the other hand, enhances safety and reduces faulty triggering.

BRIEF DESCRIPTION OF THE DRAWINGS

The present invention will be described in greater detail below by way of reference to the accompanying drawings, wherein.

DETAILED DESCRIPTION OF THE INVENTION

Figure 1:
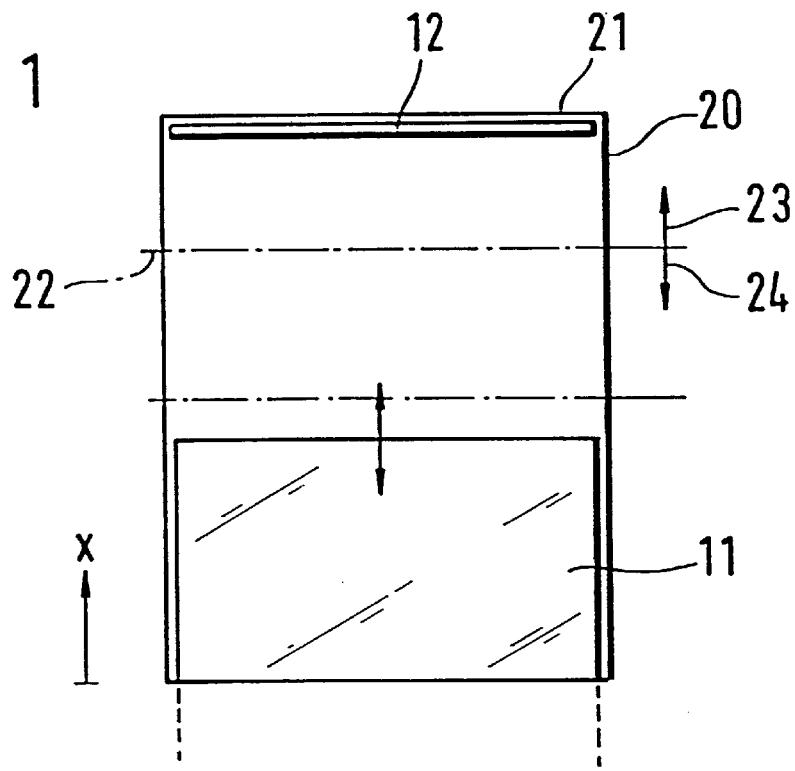
FIG. 1 shows the apparatus and the division of the position regions.

In FIG. 1, starting from an open state, a part 11, for example, a window, first traverses the second position region 24 in the direction x until it gets into the first position region 23 at a region boundary 22. In the closed state, the part is disposed in the end position 21 which is a part of a frame 20 and is preceded by a switching strip 12.

Figure 2:
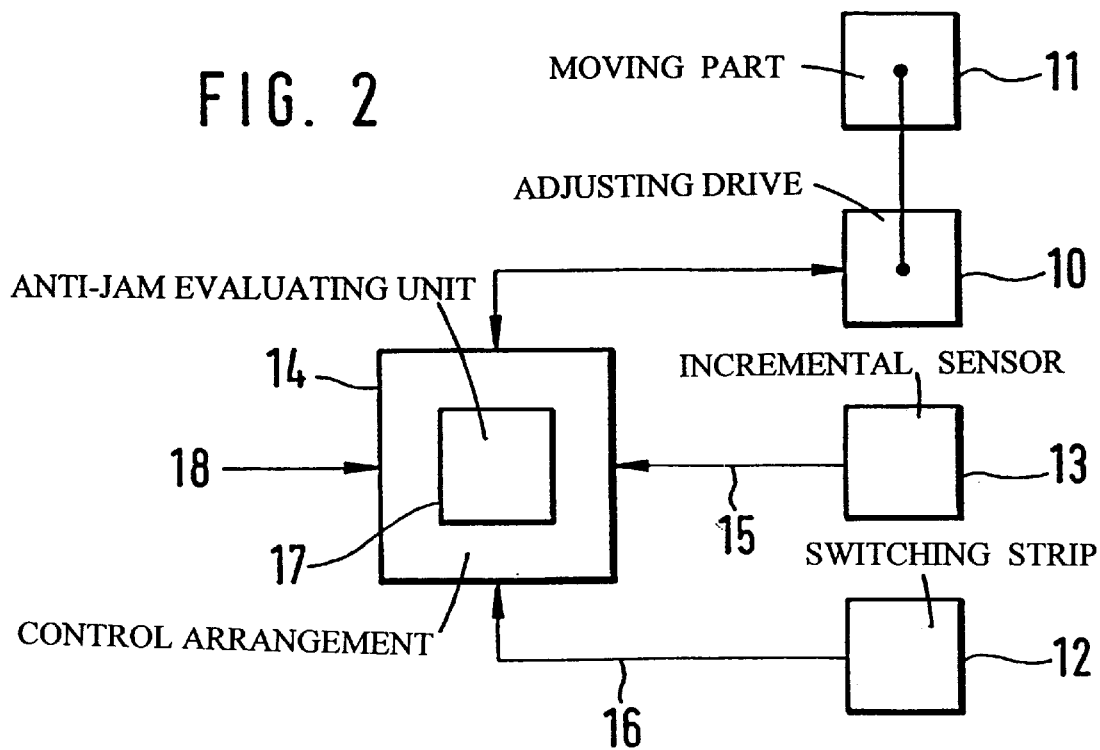
FIG. 2 schematically illustrates the functioning of the apparatus.

In FIG. 2, an adjusting drive 10 moves the part 11. An incremental sensor 13 emits an incremental signal 15 to a control arrangement 14 which includes an anti-jam evaluating unit 17. A switching strip 12 emits a switching strip signal 16 to the control arrangement which exchanges signals with the adjusting drive 10. The desired operating mode is communicated to the control arrangement 14 via an operating unit 18.

The arrangement illustrated in FIGS. 1 and 2 functions as follows:

The incremental sensor 13 supplies incremental signals 15. These incremental signals 15 are added or subtracted in a manner that depends on the direction of rotation, for example, via a counter. The counter reading is a measure for the position in which the part 11 is disposed at that time. A Hall sensor, for example, is used as incremental sensor 13; it emits signals as a function of the magnetic ring division and the rotor position of the electric motor, of adjusting drive 10. In another embodiment, an evaluation of the waviness (ripple count, i.e., a count of peaks or periods) of the armature current of the electric motor serves to detect the position. In addition to detecting the position of the part 11, the control arrangement 14 also determines the rotational speed and thus the speed of the part by means of a time evaluation of the incremental signals 15. The actual rotational speed is continuously compared with a rotational limit speed; if the actual speed remains under the rotational limit speed, it is recognized that the part 11 is jammed. The rotational limit speed can be changed as a function of the position.

The switching strip 12 is known from DE-A 43 18 448. The switching strip signal 16 becomes logical one when the switching strip 16 is pressed.

Starting from the open state, the closing of the side window, for example, is communicated via the operating unit 18 of the control arrangement 14. The adjusting drive 10 is actuated by the control arrangement 14 in such a manner that it moves the part 11 in the closing direction. A comparison is carried out continuously to determine whether the part 11 is still disposed within the second position region 24 in that the counter reading as a measure of the present position does not yet exceed or fall below a parameterizable region boundary 22 (by "parameterizable" it is meant that the region boundary 22 may be selected based on specific parameters and corresponding to respective requirements). As long as the part 11 is disposed within the second position region 24, the anti-jam system responds when the incremental sensor 13 and the switching strip both detect a jam. This reduces the probability of faulty triggering. When the anti-jam system is triggered, the adjusting drive 10 is either stopped or reversed.

In a further embodiment, a third position region could now follow which is traversed by the part during the closing process. In the third position region, the anti-jam system only responds when the switching strip 12 indicates a jam.

In the application according to FIG. 1, the part 11 gets into the first position region 23 after traversing the second position region 24 and after crossing the region boundary 22. In this first position region which, for example, for a side window begins 10 cm ahead of the closing position, higher safety requirements must be met. The anti-jam system responds either when the switching strip 12 detects a jam or when a recognition of a jam is present which was derived from the rotational speed of the adjusting drive 10. This reduces the risk of persons getting caught.

The present invention has been described in detail with respect to preferred embodiments. It will be apparent from the foregoing to those skilled in the art that changes and modifications may be made without departing from the present invention. In its broader aspects, the present invention, as defined in the appended claims, is intended to cover all such changes and modifications within the true spirit of the invention.

What is claimed is:

1. An apparatus that operates an electric adjusting drive arranged in a vehicle, the apparatus comprising:

an electronic control unit including an anti-jam system for controlling the adjusting drive;

a switching strip which is arranged at an end position of a part that is moved by the adjusting drive, and which, in the presence of a pressure load, emits signals to the electronic control unit;

an incremental sensor from whose signals the electronic control unit determines the position of the part, a measure for the rotational speed of the adjusting drive and an indication of a jam derived from the rotational speed; and at least two position regions which are traversed by the part during movement of the part and forming a partition of the region over which the part moves;

wherein in a first position region, which is disposed closer to the switching strip, the anti-jam system responds either when signals of the switching strip detect a jam or when a jam indication which was derived from the rotational speed is present; and wherein, in a second position region, which is further removed from the switching strip than the first position region, the anti-jam system responds when both: (a) signals of the switching strip detect a jam, and (b) a jam indication derived from the rotational speed is present.

2. An apparatus according to claim 1, wherein the incremental sensor is a Hall sensor.

3. An apparatus according to claim 1, wherein the incremental sensor is a sensor which detects the signal waviness of the motor current.

4. An apparatus according to claim 1, wherein the at least two position regions are freely selectable.

5. An apparatus according to claim 1, wherein the apparatus operates a window.

6. An apparatus according to claim 1, wherein the apparatus operates a sliding roof.

7. A method of operating an electric adjusting drive arranged in a vehicle, the method controlling the movement of a movable part, comprising the steps of:

detecting, by means of a switching strip located at an end position of said movable part in its region of movement, the presence of a pressure load at said end position;

detecting signals from an incremental sensor that monitors said electric adjusting drive;

determining, based on the signals detected from said incremental sensor, the position of the movable part, a measure of the rotational speed of the electric adjusting drive and an indication of an occurrence of a jam, based on said measure of the rotational speed; and controlling said electric adjusting drive to adjust the position of said movable part to alleviate a jam;

wherein the region of movement of the movable part is divided into at least two position regions;

wherein, in a first position region located near said switching strip, an occurrence of a jam is determined to occur when either: (a) signals detected from said switching strip indicate the occurrence of a jam, or (b) said jam occurrence indication is present; and wherein, in a second position region farther away from said switching strip than said first position region, an occurrence of a jam is determined to occur when both: (a) signals detected from said switching strip indicate the occurrence of a jam, and (b) said jam occurrence indication is present.

8. A method according to claim 7, wherein an electrical control unit is arranged to perform the determination of an occurrence of a jam.

9. A method according to claim 8, wherein an anti-jam system forming part of said electrical control unit controls said electric adjusting drive to alleviate a jam.

10. A method according to claim 7, wherein the step of detecting signals from an incremental sensor comprises the step of detecting signals indicating the waviness of a motor current of said electric adjusting drive.

11. A method according to claim 7, wherein the step of detecting signals from an incremental sensor comprises the step of detecting signals from a Hall sensor.

12. A method according to claim 7, wherein said movable part is a window.

13. A method according to claim 7, wherein said movable part is a sliding roof.

14. A method according to claim 7, wherein said at least two position regions are freely selectable.

* * * * *